(12) United States Patent
Bouzid et al.

(10) Patent No.: US 12,122,884 B2
(45) Date of Patent: Oct. 22, 2024

(54) CONTROLLING THE RHEOLOGY OF A METAL ORE RESIDUE

(71) Applicant: COATEX, Genay (FR)

(72) Inventors: Mehdi Bouzid, Sainte Foy les Lyon (FR); Christian Jacquemet, Lyons (FR); Benoit Magny, Cailloux sur Fontaines (FR); Jacques Mongoin, Quincieux (FR)

(73) Assignee: COATEX, Genay (FR)

( * ) Notice: Subject to any disclaimer, the term of this patent is extended or adjusted under 35 U.S.C. 154(b) by 894 days.

(21) Appl. No.: 15/734,386

(22) PCT Filed: Jun. 5, 2019

(86) PCT No.: PCT/FR2019/000090
§ 371 (c)(1),
(2) Date: Dec. 2, 2020

(87) PCT Pub. No.: WO2019/234313
PCT Pub. Date: Dec. 12, 2019

(65) Prior Publication Data
US 2021/0171723 A1 Jun. 10, 2021

(30) Foreign Application Priority Data
Jun. 8, 2018 (FR) ........................ 1854989

(51) Int. Cl.
| | | |
|---|---|---|
| C08J 3/05 | (2006.01) | |
| C08F 2/22 | (2006.01) | |
| C08F 220/06 | (2006.01) | |
| C08F 220/18 | (2006.01) | |
| C22B 3/26 | (2006.01) | |
| C22B 3/40 | (2006.01) | |
| C22B 15/00 | (2006.01) | |

(52) U.S. Cl.
CPC ................... *C08J 3/05* (2013.01); *C08F 2/22* (2013.01); *C08F 220/06* (2013.01); *C08F 220/1802* (2020.02); *C22B 3/41* (2021.05); *C22B 15/00* (2013.01)

(58) Field of Classification Search
CPC ... C08J 3/05; C08F 2/22; C08F 220/06; C08F 220/1802; C22B 3/41; C22B 15/00; B01D 21/01; C02F 2103/10; C02F 1/56
See application file for complete search history.

(56) References Cited

U.S. PATENT DOCUMENTS

| | | |
|---|---|---|
| 6,231,768 B1 | 5/2001 | Barham et al. |
| 6,365,116 B1 | 4/2002 | Barham et al. |
| 2011/0155671 A1 | 6/2011 | Moody et al. |
| 2012/0145644 A1* | 6/2012 | Moody ............... B01D 21/01 210/721 |
| 2018/0362371 A1 | 12/2018 | Favero et al. |

FOREIGN PATENT DOCUMENTS

| | | |
|---|---|---|
| GB | 1 414 964 | 11/1975 |
| WO | WO 00/43317 A1 | 7/2000 |
| WO | WO 2007/082797 A1 | 7/2007 |
| WO | WO 2017/097799 A1 | 6/2017 |

OTHER PUBLICATIONS

International Search Report issued on Aug. 30, 2019 in PCT/FR2019/000090 filed on Jun. 5, 2019, citing documents AA-AE and AO-AR therein, 2 pages.

* cited by examiner

*Primary Examiner* — Anthony M Liang
*Assistant Examiner* — Danny N Kang
(74) *Attorney, Agent, or Firm* — Oblon, McClelland, Maier & Neustadt, L.L.P.

(57) ABSTRACT

A method for preparing an aqueous mineral suspension from an aqueous metal ore residue may include introducing into the aqueous metal ore residue a polymer (P) having a molecular mass Mw measured by GPC ranging from 2,000 to 20,000 g/mol. The polymer (P) may be prepared by radical polymerization of at least one anionic monomer (M). The suspension produced by such a method may have a Brookfield viscosity of which is lower than 1,800 mPa·s or a yield point of lower than 80 Pa.

20 Claims, No Drawings

CONTROLLING THE RHEOLOGY OF A METAL ORE RESIDUE

CROSS-REFERENCE TO RELATED APPLICATIONS

The present application is the national stage of international application PCT/FR2019/000090, filed on Jun. 5, 2019, and claims the benefit of the filing date of French Appl. No. 1854989, filed on Jun. 8, 2018.

The invention relates to a method for preparing an aqueous mineral suspension from an aqueous metal ore residue into which is introduced a polymer (P) with a molecular mass Mw, measured by GPC, ranging from 2,000 to 20,000 g/mol and prepared by radical polymerisation of at least one anionic monomer (M). The invention also relates to the suspension produced whose Brookfield viscosity is less than 1,800 mPa·s or whose flow threshold is less than 80 Pa.

The method according to the invention is used in a mining process involving at least one mineral deposit. These mining methods generally make it possible to obtain at least one useable metal from a metal ore. The metal ore also comprises a residue of this metal ore. The mining methods are usually implemented using water as a medium for processing or conveying the dry solids content. Therefore, the metal ore residue is usually an aqueous metal ore residue. It can also be a sludge of metal ore residue. It can also be a muddy residue of ore.

According to the invention, the aqueous metal ore residue thus results from at least one step in which the useable metal or a derivative of the useable metal is separated from a metal ore, in particular a metal ore produced by mining extraction. According to the invention, the fraction of the useable metal ore is a metal or several metals or a derivative of a metal or a derivative of several metals.

When using the method of preparation according to the invention, an essential step consists of adding at least one polymer (P) to an aqueous metal ore residue. This step therefore relates to the processing of a metal ore residue. It does not relate to the processing of the useable metal ore. This step is therefore generally used in a mining method comprising various steps for processing the metal ore and various steps for processing the metal ore residue.

Typically, mining methods comprise several steps for processing the metal ore, several steps for processing the useable metal or for processing the derivative of the useable metal as well as several steps for processing the metal ore residue.

A mining method typically comprises one or more of the following steps:
- crushing the metal ore,
- grinding the metal ore, in particular dry grinding or wet grinding, usually in water,
- separating, in particular by flotation, the useable metal or a derivative of the useable metal and the metal ore residue, particularly the aqueous residue,
- purifying or enriching the useable metal or a derivative of the useable metal, in particular by flotation,
- concentrating the metal ore residue, for example by filtration, by settling, by gravity, by using a thickener, by flocculation,
- partially separating the aqueous metal ore residue and part of the water,
- conveying the aqueous metal ore residue and
- storing the aqueous metal ore residue.

There are known methods for preparing an aqueous mineral suspension from an aqueous metal ore residue, particularly the methods used to process, convey or store such a residue.

Document GB 1414964 relates to a method for deflocculating a particulate material that consists of adding a copolymer or a water-soluble derivative of a vinyl copolymer to a grout of the particulate material.

Document WO 2007-082797 describes a method for concentrating an aqueous suspension of solid particles combining the use of a flocculant polymer and the use of radiation or of radical agents, oxidising agents or enzymes.

Document WO 2017-097799 discloses a method for processing an aqueous effluent resulting from oil sands mining operations that comprises the addition of a sulphonated dispersing agent and then the addition of a flocculating agent.

Document WO 00-43317 discloses the use of a viscosity-modifying compound in a sludge thickener in which this compound is incorporated into a thickener in a specific way.

To facilitate their handling, the known suspensions typically have a lower solids content. In fact, adding water may help to lower the viscosity or the flow threshold of these suspensions.

However, adding water leads to problems with water consumption, energy consumption or even problems with organising and storing the aqueous metal ore residues.

It is therefore important to have methods for preparing an aqueous mineral suspension from an aqueous metal ore residue having a high dry solids content.

It is also important to have such methods that make it possible to prepare stable suspensions, in particular at high dry solids contents. Likewise, it is important to have such methods which make it possible to prepare suspensions that are stable and in which the particles of dry solids content have a particle size distribution that is relatively coarse or is not very uniform.

Compatibility with the various constituents of aqueous mineral suspensions prepared from an aqueous metal ore residue is also an important property to look for, in particular compatibility with a flocculation agent that can be used to process aqueous metal ore residue, in particular compatibility with a polyacrylamide or a polyacrylamide derivative. Likewise, it is important to be able to control the viscosity of aqueous mineral suspensions prepared from a mining derivative, in particular to make it easier to pump, stir or convey them.

Moreover, it is important to have methods that make it possible to control the flow threshold of the aqueous metal ore residue.

It is particularly important to confer on an aqueous metal ore residue a flow threshold with a minimum threshold value that makes it possible to eliminate or reduce the risk of the solid portion of the residue settling in case there is no shearing or if there is slight shearing.

Reducing the consumption of water when processing aqueous metal ore residues should also be sought.

Water recovery or recycling during the various steps in the mining methods is also to be preferred.

Both the amount of water that is separated or recycled and the quality of the separated or recycled water should be sought.

It is also important to be able to control the behaviour of the aqueous mineral suspensions prepared from an aqueous metal ore residue in order to avoid problems with the processing, storage or conveying equipment. Indeed, this equipment can be damaged, jammed or clogged if there is a drift in or lack of control of the viscosity or of the flow threshold of a mineral suspension prepared from an aqueous metal ore residue.

There is therefore a need for improved methods for preparing an aqueous mineral suspension from an aqueous metal ore residue.

The method according to the invention provides a solution to all or part of the problems with the methods used in the prior art to prepare an aqueous mineral suspension from an aqueous metal ore residue.

Thus, the invention provides a method for preparing an aqueous mineral suspension with a dry solids content that is greater than 40% by weight of the suspension and having at least one property chosen among:
 a Brookfield viscosity, measured at 100 rpm and at 25° C., of less than 1,800 mPa·s,
 a flow threshold, measured at a temperature of 25° C. using a rheometer with imposed shearing, equipped with a bladed spindle, for a particular torsional loading, of less than 80 Pa and
 a Brookfield viscosity, measured at 100 rpm and at 25° C., of less than 1,800 mPa·s and a flow threshold, measured at a temperature of 25° C. using a rheometer with imposed shearing, equipped with a bladed spindle, for a particular torsional loading, of less than 80 Pa,
comprising the addition, in an aqueous metal ore residue, of at least one polymer (P) with a molecular mass Mw, measured by GPC, ranging from 2,000 to 20,000 g/mol and prepared by at least one radical polymerisation reaction, at a temperature greater than 50° C., of at least one anionic monomer (M) comprising at least one polymerisable olefinic unsaturation and at least one carboxylic acid group or one of its salts, in the presence of at least one radical-generating compound chosen among hydrogen peroxide, benzoyl peroxide, acetyl peroxide, laurel peroxide, tert-butyl hydroperoxide, cumene hydroperoxide, ammonium persulphate, an alkaline metal persulphate, preferably sodium persulphate or potassium persulphate, an azo compound such as 2,2'-azobis (2-(4,5-dihydroimidazolyl)propane, 2,2'-azobis(2-methyl-propionamidine) dihydrochloride, diazo-valeronitrile, 4,4'-azobis-(4-cyanovaleric) acid, AZDN or 2,2'-azobisisobutyronitrile, and their respective combinations or associations with an ion chosen among $Fe^{II}$, $Fe^{III}$, $Cu^{I}$, $Cu^{II}$ and mixtures thereof.

The method according to the invention therefore makes it possible to control the essential properties of the aqueous suspension prepared. This method makes it possible to control both the Brookfield viscosity and the flow threshold of the prepared suspension.

According to the invention, the Brookfield viscosity is measured at 100 rpm and at 25° C., for example using a Brookfield DV3T rheometer. The Brookfield viscosity of the prepared suspension is less than 1,800 mPa·s. Preferably, the method according to the invention makes it possible to prepare a suspension with a viscosity of less than 1,500 mPa·s or less than 1,200 mPa·s. More preferably, the viscosity is less than 1,000 mPa·s or less than 900 mPa·s. Much more preferentially, the viscosity is less than 800 mPa·s or less than 700 mPa·s or even less than 500 mPa·s.

Particularly advantageously, the method according to the invention makes it possible to control, in particular to lower, the flow threshold of the aqueous metal ore residue relative to the flow threshold of the aqueous metal ore residue that does not comprise any polymer (P).

According to the invention, the flow threshold, which characterises the flow resistance, is measured on a sample of an aqueous mineral suspension, particularly of an aqueous metal ore residue. The flow threshold is the shearing that must be applied to a suspension to cause it to flow. If the shearing is insufficient, the suspension deforms elastically whereas if the shearing is sufficient, the suspension can flow like a liquid.

According to the invention, the flow threshold expressed in Pascals (Pa) is measured at a temperature of 25° C. using a Brookfield DV3T rheometer with imposed shearing, equipped with a suitable spindle with blades. Without destroying the underlying structure, the bladed spindle is immersed into the material up to the first immersion mark. After a five-minute wait time, the measure is taken without pre-shearing at a speed of 0.5 rpm. This relatively low speed is preferred so as to minimise the inertia effect of the bladed spindle. The variation in torsional loading measured by the instrument in order to maintain a spin speed of 0.5 rpm is tracked over time. The value of the flow limit or flow threshold of the aqueous residue is indicated by the instrument when this variation becomes zero.

According to the invention, the flow threshold is measured at a temperature of 25° C. using a rheometer with imposed shearing, equipped with a bladed spindle, for a particular torsional loading. The flow threshold of the prepared suspension is less than 80 Pa. Preferably, the method according to the invention makes it possible to prepare a suspension that has a flow threshold of less than 70 Pa or less than 60 Pa. More preferably, the flow threshold is less than 50 Pa or less than 40 Pa. More preferentially, the flow threshold is less than 30 Pa or less than 20 Pa.

Also preferably, the method according to the invention makes it possible to prepare a suspension that has a flow threshold greater than 10 Pa. More preferentially, the flow threshold is greater than 12 Pa. Even more preferentially, the flow threshold is greater than 15 Pa.

Thus, the flow threshold is greater than 10 Pa, preferably greater than 12 Pa, more preferentially greater than 15 Pa and less than 70 Pa or less than 60 Pa, preferably less than 50 Pa or less than 40 Pa, more preferentially less than 30 Pa or less than 20 Pa.

Preferably, the flow threshold of the suspension according to the invention ranges from 10 to 80 Pa, or to 70 Pa, to 60 Pa, to 50 Pa, to 40 Pa, to 30 Pa or to 20 Pa. Also preferably, the flow threshold of the suspension according to the invention ranges from 12 to 80 Pa, or to 70 Pa, to 60 Pa, to 50 Pa, to 40 Pa, to 30 Pa or to 20 Pa. Also preferably, the flow threshold of the suspension according to the invention ranges from 15 to 80 Pa, or to 70 Pa, to 60 Pa, to 50 Pa, to 40 Pa, to 30 Pa or to 20 Pa.

The method according to the invention makes it possible to control the rheology of the prepared suspension for a dry solids content greater than 40% by weight of the suspension. Preferably, the method according to the invention makes it possible to prepare a suspension having a dry solids content greater than 50% by weight or 55% by weight. More preferably, the method according to the invention makes it possible to prepare a suspension having a dry solids content greater than 60% by weight or greater than 65% by weight. Much more preferentially, the method according to the invention makes it possible to prepare a suspension having a dry solids content greater than 70% by weight or greater than 75% by weight.

According to the invention, the amount of polymer (P) used may vary quite widely. Preferably according to the invention, the prepared suspension comprises from 0.01 to 2% by weight or from 0.01 to 1.8% or from 0.01 to 1.5% of polymer (P) (dry/dry relative to the ore residue). More preferentially, the prepared suspension comprises from 0.01 to 1.2% or from 0.01 to 1% or from 0.02 to 0.8% or from 0.03 to 0.5% or from 0.04 to 0.25% or from 0.04 to 0.15% by weight of polymer (P) (dry/dry relative to the ore residue).

The method according to the invention may use one or more polymers (P). Preferably, the suspension prepared thus comprises one, two or three different polymers (P). The method according to the invention may also comprise the further addition of at least one compound chosen among a lignosulphonate derivative, a silicate, an unmodified polysaccharide and a modified polysaccharide.

The method according to the invention comprises the addition of at least one polymer (P) to an aqueous mineral ore residue. Preferably, the metal ore is not an aluminium ore. Also preferably according to the invention, the metal ore is chosen among lithium, strontium, lanthanide, actinide, uranium, rare earth, titanium, zirconium, vanadium, niobium, chromium, molybdenum, tungsten, manganese, iron, cobalt, rhodium, iridium, nickel, palladium, platinum, copper, silver, gold, zinc, cadmium, tin and lead ores. More preferably according to the invention, the metal ore is chosen among uranium, molybdenum, manganese, iron, cobalt, nickel, copper, silver and gold ores. Much more preferably, it is a copper ore. It can also be a derivative of several useable metals comprising copper, zinc and cobalt.

According to the invention, the metal ore comprises at least one useable metal or at least one useable metal derivative obtained by separating all or part of the residue from the metal ore. Preferably according to the invention, the metal ore comprises a metal oxide, a metal sulphide or a metal carbonate.

According to the invention, the metal ore residue may comprise a certain residual amount of metal. Particularly, the metal ore residue may comprise a residual amount of metal of less than 2,000 g per tonne (dry/dry) relative to the amount of metal ore residue. This amount of metal in the metal ore residue can typically range from 10 to 2,000 g per tonne (dry/dry) or from 10 to 1,000 g per tonne (dry/dry), relative to the amount of metal ore residue.

When using the method according to the invention, the polymer (P) can be added during one or several steps in the mining process, in particular during one or several of the metal ore residue processing steps such as pumping, flocculating, concentrating, conveying or storing the metal ore residue, particularly the aqueous metal ore residue.

According to the invention, during a step of concentration of the aqueous metal ore residue according to the invention, the concentration of the aqueous metal ore residue is significantly increased. Preferably, the concentration of the aqueous metal ore residue is increased from 10 to 40% by weight or from 20 to 40% by weight or from 10 to 50% by weight or from 20 to 50% by weight. Also preferably, the concentration of the aqueous metal ore residue is increased from 10 to 70% by weight or from 20 to 70% by weight or from 10 to 60% by weight or from 20 to 60% by weight.

Preferably according to the invention, the polymer (P) is added:
  before a step of pumping the aqueous metal ore residue, in particular using a pump chosen among a centrifugal pump, a peristaltic pump, a positive displacement pump, a compressed air pump, a diaphragm pump, a rotary pump or
  during a pumping step of the aqueous metal ore residue, in particular using a pump chosen among a centrifugal pump, a peristaltic pump, a positive displacement pump, a compressed air pump, a diaphragm pump, a rotary pump or
  after a step of pumping the aqueous metal ore residue, in particular using a pump chosen among a centrifugal pump, a peristaltic pump, a positive displacement pump, a compressed air pump, a diaphragm pump, a rotary pump.

Also preferably according to the invention, the polymer (P) is added:
  before a step of flocculation of the aqueous metal ore residue, for example using a polyacrylamide or a polyacrylamide derivative or
  during a step of flocculation of the aqueous metal ore residue, for example using a polyacrylamide or a polyacrylamide derivative such as alkylene bis-acrylamide, particularly ethylene bis-acrylamide or
  after a step of flocculation of the aqueous metal ore residue, for example using a polyacrylamide or a polyacrylamide derivative such as alkylene bis acrylamide, particularly ethylene bis-acrylamide.

Also preferably according to the invention, the polymer (P) is added:
  before a step of concentration of the aqueous metal ore residue, in particular by gravimetric concentration, for example using at least one device chosen among a conventional thickener, a high-density thickener, a high-yield thickener, or by densimetric concentration, for example using at least one device chosen among a conventional thickener, a high-density thickener, a high-yield thickener, or by filtration, for example using at least one device chosen among a filter, a filter press, a rotary filter or
  during a step of concentration of the aqueous metal ore residue, in particular by gravimetric concentration, for example using at least one device chosen among a conventional thickener, a high-density thickener, a high-yield thickener, or by densimetric concentration, for example using at least one device chosen among a conventional thickener, a high-density thickener, a high-yield thickener, or by filtration, for example using at least one device chosen among a filter, a filter press, a rotary filter or
  after a step of concentration of the aqueous metal ore residue, in particular by gravimetric concentration, for example using at least one device chosen among a conventional thickener, a high-density thickener, a high-yield thickener, or by densimetric concentration, for example using at least one device chosen among a conventional thickener, a high-density thickener, a high-yield thickener, or by filtration, for example using at least one device chosen among a filter, a filter press, a rotary filter.

Also preferably according to the invention, the polymer (P) is added before a step of conveying of the aqueous metal ore residue, in particular conveying using an open pipe, a closed pipe or a pipeline.

Also preferably according to the invention, the polymer (P) is added before a step of storing the aqueous metal ore residue or during a step of storing the aqueous metal ore residue.

Particularly preferably according to the invention, the polymer (P) is added:
  before a step of pumping the aqueous metal ore residue, in particular using a pump chosen among a centrifugal pump, a peristaltic pump, a positive displacement pump, a compressed air pump, a diaphragm pump, a rotary pump or
  during a step of pumping the aqueous metal ore residue, in particular using a pump chosen among a centrifugal pump, a peristaltic pump, a positive displacement pump, a compressed air pump, a diaphragm pump, a rotary pump or after a step of concentration of the aqueous metal ore residue, in particular by gravimetric concentration, for example using at least one device chosen among a conventional thickener, a high-density thickener, a high-yield thickener, or by densimetric concentration, for example using at least one device chosen among a conventional thickener, a high-density thickener, a high-yield thickener, or by filtration, for example using at least one device chosen among a filter, a filter press, a rotary filter or before a step of conveying the aqueous metal ore residue, in particular conveying using an open pipe, a closed pipe or a pipeline.

Even more particularly preferably according to the invention, the polymer (P) is added:

before a step of pumping the aqueous metal ore residue, in particular using a pump chosen among a centrifugal pump, a peristaltic pump, a positive displacement pump or during a step of pumping the aqueous metal ore residue, in particular using a pump chosen among a centrifugal pump, a peristaltic pump, a positive displacement pump, a compressed air pump, a diaphragm pump, a rotary pump or after a step of concentration of the aqueous metal ore residue, in particular by gravimetric concentration, for example using at least one device chosen among a conventional thickener, a high-density thickener, a high-yield thickener or before a step of conveying the aqueous metal ore residue, in particular conveying using a closed pipe or a pipeline.

The method according to the invention uses at least one particular polymer (P). It is prepared by a polymerisation reaction in the presence of at least one radical-generating compound chosen among hydrogen peroxide, benzoyl peroxide, acetyl peroxide, laurel peroxide, tert-butyl hydroperoxide, cumene hydroperoxide, ammonium persulphate, an alkaline metal persulphate, preferably sodium persulphate or potassium persulphate, an azo compound such as 2,2'-azobis (2-(4,5-dihydroimidazolyl)propane, 2,2'-azobis(2-methylpropionamidine)dihydrochloride, diazo-valeronitrile, 4,4'-azobis-(4-cyanovaleric) acid, AZDN or 2,2'-azobisisobutyronitrile, and their respective combinations or associations with an ion chosen among $Fe^{II}$, $Fe^{III}$, $Cu^{I}$, $Cu^{II}$ and mixtures thereof. Preferably, this polymerisation reaction does not use benzoyl peroxide.

In addition to this radical-generating compound, the polymerisation reaction can be carried out in the presence of at least one compound comprising phosphorus in the oxidation I state, preferably a compound chosen among hypophosphorous acid ($H_3PO_2$) and a derivative of hypophosphorous acid ($H_3PO_2$), preferably a compound comprising at least one hypophosphite ion ($H_2PO_2$), more preferentially a compound chosen among sodium hypophosphite ($H_2PO_2Na$), potassium hypophosphite ($H_2PO_2K$), calcium hypophosphite ($[H_2PO_2]_2Ca$) and mixtures thereof.

Likewise, the polymerisation reaction can be carried out in the presence of at least one compound comprising phosphorus in the oxidation III state, preferably a compound chosen among phosphorous acid and a derivative of phosphorous acid, more preferentially a compound comprising at least one phosphite ion, in particular a compound chosen among sodium phosphite, calcium phosphite, potassium phosphite, ammonium phosphite and combinations thereof.

The polymerisation reaction can also be carried out in the presence of at least one compound comprising a bisulphite ion, preferably a compound chosen among ammonium bisulphite, an alkaline metal bisulphite, in particular sodium bisulphite, potassium bisulphite, calcium bisulphite, magnesium bisulphite and combinations thereof. The polymerisation reaction can also be carried out in the presence of from 0.05 to 5% by weight, relative to the total amount of monomers, of at least one compound chosen among a xanthate derivative, a mercaptan compound and a compound of formula (I):

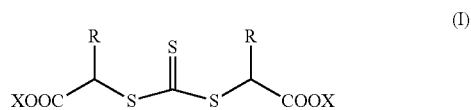

wherein:
X independently represents H, Na or K and
R independently represents a $C_1$-$C_5$-alkyl group, preferably a methyl group; particularly a compound of formula (I) which is disodic diisopropionate trithiocarbonate (DPTTC).

According to the invention, the polymerisation reaction is carried out at a temperature greater than 50° C. Preferably, the polymerisation reaction is carried out at a temperature ranging from 50 to 98° C. or from 50 to 95° C. or from 50 to 85° C. A higher temperature, in particular above 100° C., may be used by adjusting the pressure of the reaction medium to prevent evaporation.

Preferably, the polymerisation reaction is carried out in water. It can also be carried out in a solvent, alone or mixed with water, in particular an alcoholic solvent, particularly isopropyl alcohol. More preferably, it is carried out in water.

Advantageously, the polymer (P) used according to the invention has a molecular mass Mw, measured by GPC, ranging from 2,200 to 10,000 g/mol. Preferably, the polymer (P) used according to the invention has a molecular mass Mw ranging from 2,400 to 9,500 g/mol or from 2,400 to 8,000 g/mol, more preferentially from 2,400 to 6,500 g/mol. The polymer (P) used according to the invention is therefore not a flocculating agent.

According to the invention, the molecular mass Mw of the copolymers is determined by Gel Permeation Chromatography (GPC). This technique uses a Waters liquid chromatography apparatus equipped with a detector. This detector is a Waters refractive index detector. This liquid chromatography apparatus is equipped with a steric exclusion column in order to separate the various molecular weights of the copolymers studied. The liquid elution phase is an aqueous phase adjusted to pH 9.00 using 1N sodium hydroxide containing 0.05 M of $NaHCO_3$, 0.1 M of $NaNO_3$, 0.02 M of triethanolamine and 0.03% of $NaN_3$.

According to a first step, the copolymer solution is diluted to 0.9% by dry weight in the dissolution solvent of the GPC, which corresponds to the liquid elution phase of the GPC to which is added 0.04% of dimethyl formamide which acts as a flow rate marker or internal standard. Then it is filtered using a 0.2 μm filter. Then 100 μL are injected into the chromatography instrument (eluent: an aqueous phase adjusted to pH 9.00 by 1N sodium hydroxide containing 0.05 M of $NaHCO_3$, 0.1 M of $NaNO_3$, 0.02 M of triethanolamine and 0.03% of $NaN_3$). The liquid chromatography apparatus has an isocratic pump (Waters 515) the flow rate of which is set to 0.8 mL/min. The chromatography instrument also comprises an oven which itself comprises the following system of columns in series: a Waters Ultrahydrogel Guard precolumn 6 cm long and 40 mm in inner diameter and a Waters Ultrahydrogel linear column 30 cm long and 7.8 mm in inner diameter. The detection system is comprised of a Waters 410 RI refractive index detector. The oven is heated to 60° C. and the refractometer is heated to 45° C.

The chromatography instrument is calibrated using powdered sodium polyacrylate standards of different molecular masses certified by the supplier: Polymer Standards Service or American Polymers Standards Corporation (molecular mass ranging from 900 to $2.25 \times 10^6$ g/mol and polymolecularity index ranging from 1.4 to 1.8).

The polymer (P) used according to the invention can be completely or partially neutralised, in particular at the end of the polymerisation reaction. According to the invention, the neutralisation of the polymer is carried out by neutralising or salifying all or part of the carboxylic acid groups present in the polymer. Preferably, this neutralisation is carried out using a base, for example using a derivative of an alkaline metal or a derivative of an alkaline-earth metal.

The preferred bases are chosen among CaO, ZnO, MgO, NaOH, KOH, $NH_4OH$, $Ca(OH)_2$, $Mg(OH)_2$, monoisopropylamine, triethanolamine, triisopropylamine, 2-amino-2-methyl-1-propanol (AMP), triethylamine, diethylamine, monoethylamine. Particularly preferably, neutralisation is carried out using MgO, NaOH, KOH, $Ca(OH)_2$, $Mg(OH)_2$, alone or in combination.

According to the invention, the polymerisation reaction uses at least one anionic monomer (M) comprising at least one polymerisable olefinic unsaturation and at least one carboxylic acid group or one of its salts.

Preferably, the anionic monomer (M) comprising at least one polymerisable olefinic unsaturation comprises one or two carboxylic acid groups, particularly a single carboxylic acid group. More preferably, it is chosen among acrylic acid, methacrylic acid, an acrylic acid salt, a methacrylic acid salt and mixtures thereof, much more preferentially acrylic acid.

Preferably, the polymerisation reaction uses 100% by weight of anionic monomer (M) or from 70% to 99.5% by weight of anionic monomer (M) and from 0.5% to 30% by weight of at least one other monomer.

Advantageously, the polymerisation reaction can thus also use at least one other monomer chosen among:
- another anionic monomer, preferably a monomer chosen among acrylic acid, methacrylic acid, itaconic acid, maleic acid, maleic anhydride and mixtures thereof, 2-acrylamido-2-methylpropanesulphonic acid, a salt of 2-acrylamido-2-methylpropanesulphonic acid, 2-(methacryloyloxy)ethanesulphonic acid, a salt of 2-(methacryloyloxy)ethanesulphonic acid, sodium methallyl sulphonate, styrene sulphonate and combinations or mixtures thereof,
- a non-ionic monomer comprising at least one polymerisable olefinic unsaturation, preferably at least one polymerisable ethylenic unsaturation and in particular a polymerisable vinyl group, more preferentially a non-ionic monomer chosen among styrene, vinyl caprolactam, the esters of an acid comprising at least one monocarboxylic acid group, in particular an ester of an acid chosen among acrylic acid, methacrylic acid and mixtures thereof, for example hydroxyethyl acrylate, hydroxypropyl acrylate, hydroxyethyl methacrylate, hydroxypropyl methacrylate, alkyl acrylate, in particular $C_1$-$C_{10}$-alkyl acrylate, preferentially $C_1$-$C_4$-alkyl acrylate, more preferentially methyl acrylate, ethyl acrylate, n-propyl acrylate, isopropyl acrylate, isobutyl acrylate, n-butyl acrylate, alkyl methacrylate, in particular $C_1$-$C_{10}$-alkyl methacrylate, preferentially $C_1$-$C_4$-alkyl methacrylate, more preferentially methyl methacrylate, ethyl methacrylate, n-propyl methacrylate, isopropyl methacrylate, isobutyl methacrylate, n-butyl methacrylate, aryl acrylate, preferably phenyl acrylate, benzyl acrylate, phenoxyethyl acrylate, aryl methacrylate, preferably phenyl methacrylate, benzyl methacrylate, phenoxyethyl methacrylate and
- a monomer of formula (II):

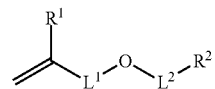

(II)

wherein:
- $R^1$ and $R^2$, identical or different, independently represent H or $CH_3$,
- $L^1$ independently represents a group chosen among $C(O)$, $CH_2$, $CH_2$—$CH_2$ and $O$—$CH_2$—$CH_2$—$CH_2$—$CH_2$,
- $L^2$ independently represents a group chosen among $(CH_2$—$CH_2O)$, $(CH_2CH(CH_3)O)_y$, $(CH(CH_3)CH_2O)_z$ and combinations thereof and
- x, y and z, identical or different, independently represent an integer or decimal comprised in a range from 0 to 150 and the sum of x+y+z is comprised in a range from 10 to 150.

Particularly preferably, the monomer of formula (II) is such that:
- $R^1$ represents $CH_3$,
- $R^2$ represents H,
- $L^1$ represents a $C(O)$ group,
- $L^2$ independently represents a combination of groups chosen among $(CH_2$—$CH_2O)_x$, $(CH_2CH(CH_3)O)_y$, $(CH(CH_3)CH_2O)_z$ and
- x, y and z, identical or different, independently represent an integer or decimal comprised in a range from 0 to 150 and the sum of x+y+z is comprised in a range from 10 to 150.

Preferably, the polymer (P) used according to the invention is a non-sulphonated polymer.

When preparing the polymer (P) used according to the invention, a separation step can also be carried out.

According to the invention, the separation can be carried out after the full or partial neutralisation of the polymer (P). It can also be carried out prior to neutralising the polymer (P).

The aqueous solution of the fully or partially neutralised polymer (P) can be processed using the static or dynamic split methods known as such.

To do so, one or more polar solvents in the group comprised in particular of methanol, ethanol, n-propanol, isopropanol, butanol, acetone and tetrahydrofuran, can be used, thus resulting in a two-phase separation.

During the separation, the least dense phase contains the largest fraction of the polar solvent and the fraction of polymers with low molecular weight, and the densest aqueous phase contains the fraction of polymers with the highest molecular weight.

The temperature at which the polymer fraction selection is processed can influence the partition coefficient. It is typically comprised within a range of from 10 to 80° C., preferably from 20 to 60° C. During the separation, it is important to control the ratio of the amounts of dilution water and polar solvents.

When using a dynamic separation method, for example centrifugation, the ratios of the extracted fractions typically depend on the centrifugation conditions. The selection of the fraction of the polymers can also be improved by re-processing the densest aqueous phase using a new amount of polar solvent, which can be different. It can also be a mixture of polar solvents. Lastly, the liquid phase obtained after processing can be distilled to eliminate the solvent(s) used in processing.

The method of preparation according to the invention makes it possible to prepare a suspension of aqueous metal ore residue comprising at least one polymer (P) that has particularly advantageous properties, in particular rheological properties that are particularly advantageous.

Thus, the invention also provides a method for preparing an aqueous mineral suspension with a dry solids content that is greater than 50% by weight of the suspension and having at least one property chosen among:
 a Brookfield viscosity, measured at 100 rpm and at 25° C., of less than 1,800 mPa·s,
 a flow threshold measured at a temperature of 25° C. using a rheometer with imposed shearing, equipped with a bladed spindle, for a particular torsional loading, of less than 80 Pa and
 a Brookfield viscosity, measured at 100 rpm and at 25° C., of less than 1,800 mPa·s and a flow threshold, measured at a temperature of 25° C. using a rheometer with imposed shearing, equipped with a bladed spindle, for
 a particular torsional loading, of less than 80 Pa,
comprising an aqueous metal ore residue and at least one polymer (P) with a molecular mass Mw, measured by GPC, ranging from 2,000 to 20,000 g/mol and prepared by radical polymerisation reaction, at a temperature greater than 50° C., of at least one anionic monomer (M) comprising at least one polymerisable olefinic unsaturation and at least one carboxylic acid group or one of its salts, in the presence of at least one radical-generating compound chosen among hydrogen peroxide, benzoyl peroxide, acetyl peroxide, laurel peroxide, tert-butyl hydroperoxide, cumene hydroperoxide, ammonium persulphate, an alkaline metal persulphate, preferably sodium persulphate or potassium persulphate, an azo compound such as 2,2'-azobis(2-(4,5-dihydroimidazolyl)propane, 2,2'-azobis(2-methylpropionamidine)dihydrochloride, diazo-valeronitrile, 4,4'-azobis-(4-cyanovaleric) acid, AZDN or 2,2'-azobisisobutyronitrile, and their respective combinations or associations with an ion chosen among $Fe^{II}$, $Fe^{III}$, $Cu^{I}$, $Cu^{II}$ and mixtures thereof.

The particular, advantageous or preferred characteristics of the method according to the invention define suspensions according to the invention which are also particular, advantageous or preferred.

EXAMPLES

The following examples illustrate the various aspects of the invention.

The polymers used in the method according to the invention are prepared.

Polymer (P1) is prepared by placing 156 g of water and 0.013 g of iron sulphate heptahydrate into a one-litre glass reactor with mechanical stirring and oil bath heating.

Using a dosing pump, 271 g of acrylic acid at 100% by weight are weighed into a 500 mL beaker.

Using a dosing pump, 3.3 g of persulphate diluted with 15 g of water are weighed into a 20 mL test tube.

Using a dosing pump, 115 g of sodium bisulphite at 40% by weight are weighed into a 200 mL test tube.

The reactor is heated to 80° C.

30% of the persulphate solution is injected rapidly and then the remainder of this solution, the acrylic acid and the bisulphite solution are injected in parallel in:
 3 h for the acrylic acid and
 3.5 h for the persulphate and the bisulphite.

The reaction medium is kept at 80° C.

The medium is then heat-treated for 30 minutes with a solution of 0.3 g of persulphate in 4 g of water and then 4.5 g of hydrogen peroxide at 130 V.

Lastly, the pumps are rinsed with water.

The medium is heated again for 60 min at 80° C.

The solution is then neutralised using 50% by weight of sodium hydroxide in water until it reaches pH 8 and then diluted to a solids content of 42% by weight. Polymer (P1) is obtained, with a molecular mass Mw, measured by GPC, of 2,500 g/mol.

Polymer (P2) is prepared by placing 212 g of water and 0.08 g of iron sulphate heptahydrate into a one-litre glass reactor with mechanical stirring and oil bath heating.

Using a dosing pump, 303 g of acrylic acid at 100% by weight and 15 g of water are weighed into a 500 mL beaker.

Using a dosing pump, 25.6 g of sodium hypophosphite monohydrate diluted with 30 g of water are weighed into a 100 mL test tube.

Using a dosing pump, 21 g of hydrogen peroxide at 130 V and 35 g of water are weighed into a 100 mL test tube.

The reactor is heated to 95° C. and the monomer, the hypophosphite solution and the hydrogen peroxide solution are added in parallel in 120 min while keeping the temperature of the reaction medium at 95° C.

Lastly, the pumps are rinsed with water.

The medium is heated again for 60 min at 95° C.

The solution is then neutralised using 50% by weight of sodium hydroxide in water until it reaches pH 8 and then diluted to a solids content of 42% by weight. Polymer (P2) is obtained, with a molecular mass, measured by GPC, of 4,500 g/mol.

The raw material used for this series of tests is an aqueous metal ore residue from a Chilean copper mine located in the north of the country. This is waste resulting from the separation of the ore containing the useable metal from the rock extracted from the mine. This aqueous copper ore residue is in the form of a water-based suspension.

Various measures were taken beforehand on the aqueous residue in the absence of the polymer according to the invention:
 particle size distribution using a Mastersizer 2000 laser granulometer (Malvern),
 solid content using a Mettler-Toledo dry balance,
 Brookfield viscosity at 100 rpm using a Brookfield DV3T viscometer with a suitable spindle,
 flow limit value using a Brookfield DV3T viscometer using a winged module and
 flow speed using a No. 4 Ford Cup viscometer.

The particle size distribution by volume shows the presence of multiple particle populations with different sizes: D(0.1)=1.6 μm, D(0.5)=25 μm, D(0.84)=195 μm, D(0.9)=252 μm, and D(0.99)=501 μm.

The other characteristics are shown in Table 1.

TABLE 1

| | |
|---|---|
| % Solids content | 55.8 |
| Brookfield viscosity at 100 rpm, in mPa · s | 1,220 |
| pH | 10.0 |
| Conductivity in μS/cm | 2,700 |
| Viscosity, No. 4 Ford cup, in s | 25 |

A concentration of the aqueous residue is then prepared by decanting and separating a portion of the supernatant water to form an aqueous residue whose characteristics are shown in Table 2.

TABLE 2

| | |
|---|---|
| % Solids content | 60.5 |
| Brookfield viscosity at 100 rpm, in mPa · s | 3,016 |
| pH | 10.1 |
| Conductivity in μS/cm | 2,320 |
| Viscosity, No. 4 Ford cup, in s | / |

A sample of suspension of aqueous residue of reconcentrated copper ore is transferred into a 500 mL beaker and then mechanically stirred with a Raynerie mixer. Stirring varies from 800 to 1,000 rpm.

Then, a polymer (P1) according to the invention is added (0.1% by weight dry/dry) and the mixture is left under stirring for 5 to 10 min.

Stirring is then stopped to allow the Brookfield viscosities, pH and conductivity measures to be taken. The test is repeated, adding different amounts of polymer. The results are shown in Table 3.

TABLE 3

| | Polymer (P1) | | |
|---|---|---|---|
| % by weight dry/dry of polymer | Brookfield viscosity at 100 rpm (mPa · s) | pH | Conductivity (μS/cm) |
| 0 | 3,032 | 9.9 | 2,410 |
| 0.07 | 1,374 | 9.9 | 2,580 |
| 0.09 | 1,186 | 9.9 | 2,560 |
| 0.1 | 1,070 | 9.9 | 2,590 |

A dose of 0.1% by weight dry/dry of polymer (P1) makes it possible to significantly reduce the viscosity of the aqueous residue. The aqueous suspension of copper ore residue can then be handled easily.

Another test is conducted without any polymer and with two polymers (P1) and (P2) according to the invention at this dose of 0.1% by weight dry/dry. The results are shown in Table 4.

TABLE 4

| | Residue | | |
|---|---|---|---|
| | without additive | with polymer (P1) | with polymer (P2) |
| % by weight dry/dry | 0 | 0.1 | 0.1 |
| pH | 10.1 | 9.9 | 9.3 |
| Conductivity in | 2,320 | 2,590 | 2,940 |
| % Solids content | 60.5 | 60.9 | 60.5 |
| Brookfield viscosity at 100 rpm (mPa · s) | 3,016 | 1,070 | 1,188 |

A dose of 0.1% by weight dry/dry of polymer (P1) or of polymer (P2) thus also makes it possible to significantly reduce the viscosity of the aqueous residue.

The flow threshold of this aqueous copper ore residue with a solids content of 61% was then measured at a temperature of 25° C. using a Brookfield DV3T rheometer with imposed shearing, equipped with a spindle with suitable blades. Without destroying the underlying structure, the bladed spindle is immersed into the material up to the first immersion mark.

After a five-minute wait time, the measure is taken without pre-shearing at a speed of 0.5 rpm. This relatively low speed is preferred so as to minimise the inertia effect of the bladed spindle. The variation in torsional loading measured by the instrument in order to maintain a spin speed of 0.5 rpm is tracked over time.

The value of the flow limit or flow threshold of the aqueous residue is indicated by the instrument when this variation is zero. The results obtained are shown in Table 5.

TABLE 5

| | Residue Flow Threshold (Pa) | | |
|---|---|---|---|
| Time (min) | without additive | with polymer (P1) | with polymer (P2) |
| 0 | 55 | 32 | 26 |
| 2 | 60 | 48 | 37 |
| 4 | 58 | 46 | 36 |
| 6 | 55 | 42 | 33 |
| 8 | / | 38 | 31 |
| 10 | / | 33 | 30 |
| 12 | 54 | 31 | 27 |
| 14 | / | 29 | 28 |
| 16 | / | / | / |
| 18 | / | / | / |
| 20 | 50 | 28 | 28 |

Aqueous suspensions of aqueous copper ore residue with a solids content of 58%, with or without polymers (P1) and (P2), are then prepared according to the invention. The characteristics of these suspensions are measured. The results obtained are shown in Table 6.

TABLE 6

| | Residue | | |
|---|---|---|---|
| | without additive | with polymer (P1) | with polymer (P2) |
| % by weight dry/dry | 0 | 0.1 | 0.1 |
| pH | 9.8 | 10.0 | 10.0 |
| Conductivity in | 2,160 | 2,770 | 2,820 |
| Brookfield viscosity at 100 rpm (mPa · s) | 2,196 | 838 | 824 |

It can thus be seen that aqueous suspensions of reference copper residue with a solids content of 55%, 61% or 58% have high viscosities.

The addition of polymer (P1) or of polymer (P2) according to the invention makes it possible to significantly lower these viscosities as well as to control the flow threshold of these suspensions.

With the polymers according to the invention, it is therefore possible to disperse aqueous copper ore residues, in particular at the output of a thickener, which have high solids contents while controlling their rheology.

The invention claimed is:

1. A method for preparing an aqueous mineral suspension, the method comprising:
    combining, with an aqueous metal ore residue, a material comprising a polymer (P),
    wherein the polymer (P) has a molecular mass Mw, measured by GPC, in a range of from 2,000 to 20,000 g/mol,
    wherein the polymer (P) is prepared by a process comprising a radical polymerization, at a temperature greater than 50° C., of a monomer comprising an anionic monomer (M) comprising a polymerizable olefinic unsaturation and a carboxylic acid group, optionally in salt form, in the presence of a reagent comprising hydrogen peroxide, benzoyl peroxide, acetyl peroxide, laurel peroxide, tert-butyl hydroperoxide, cumene hydroperoxide, ammonium persulfate, an alkaline metal persulfate, and/or an azo compound, optionally as a combination or association comprising an $Fe^{II}$, $Fe^{III}$, $Cu^{I}$, and/or $Cu^{II}$ ion, as a radical-generator, and
    wherein the aqueous mineral suspension has a dry solid content greater than 40 wt. % of the aqueous mineral suspension, and
    wherein the aqueous mineral suspension has:
    (i) a Brookfield viscosity, measured at 100 rpm and at 25° C., of less than 1,800 mPa·s,
    and/or
    (ii) a flow threshold, measured at a temperature of 25° C. using a rheometer with imposed shearing, equipped with a bladed spindle, for a particular torsional loading, of less than 80 Pa.

2. The method of claim 1, wherein the aqueous mineral suspension has a viscosity of less than 1,500 mPa·s.

3. The method of claim 1, wherein the aqueous mineral suspension has a flow threshold of less than 70 Pa.

4. The method of claim 1, wherein the aqueous mineral suspension has a dry solids content greater than 50 wt. %.

5. The method of claim 1, wherein the aqueous mineral suspension comprises the polymer (P) in a range of from 0.01 to 2 wt. % dry, relative to dry aqueous metal ore residue weight.

6. The method of claim 1, wherein the polymer (P) is one polymer.

7. The method according to claim 1,
    wherein the aqueous metal ore residue comprises a lithium, strontium, lanthanide, actinide, uranium, rare earth, titanium, zirconium, vanadium, niobium, chromium, molybdenum, tungsten, manganese, iron, cobalt, rhodium, iridium, nickel, palladium, platinum, copper, silver, gold, zinc, cadmium, tin, and/or lead ore.

8. The method of claim 1, wherein the combining of the polymer (P) with the aqueous metal ore residue occurs:
    before pumping the aqueous metal ore residue;
    during pumping the aqueous metal ore residue;
    after pumping the aqueous metal ore residue;
    before flocculation of the aqueous metal ore residue;
    during flocculation of the aqueous metal ore residue;
    after flocculation of the aqueous metal ore residue;
    before concentration of the aqueous metal ore residue;
    during concentration of the aqueous metal ore residue;
    after concentration of the aqueous metal ore residue;
    before conveying the aqueous metal ore residue;
    before storing the aqueous metal ore residue, or
    during storing the aqueous metal ore residue.

9. The method of claim 1,
    wherein, in the radical polymerization, the reagent further comprises a first compound comprising phosphorus in the oxidation I state,
    a second compound comprising phosphorus in the oxidation III state,
    a third compound comprising a bisulfite ion,
    a xanthate derivative, a mercaptan compound, and/or a compound of formula (I) in a range of from 0.05 to 5 et. %, relative to a total monomer weight:

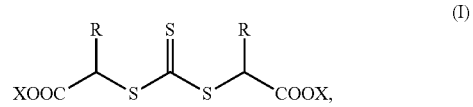

X independently being H, Na, or K, and
    R independently being a $C_1$-$C_5$-alkyl group; or
    wherein the radical polymerization is carried out at a temperature in a range of from 50 to 98° C.; or
    wherein the radical polymerization is carried out in a medium comprising water and/or a solvent;
    or
    wherein the monomer in the radical polymerization comprises:
    the anionic monomer (M) in 100 wt. %; or
    the anionic monomer (M) in a range of from 70 to 99.5 wt. % and a second monomer in a range of from 0.5 to 30 wt. %.

10. The method of claim 1, wherein the anionic monomer (M) comprises a first carboxylic acid group.

11. The method of claim 1, wherein the monomer in the radical polymerization further comprises:
    a second anionic monomer;
    2-acrylamido-2-methylpropanesulfonic acid, a salt of 2-acrylamido-2-methylpropanesulfonic acid, 2-(methacryloyloxy)ethanesulfonic acid, a salt of 2-(methacryloyloxy)ethanesulfonic acid, and/or sodium methallyl sulfonate, styrene sulfonate;
    a non-ionic monomer comprising a polymerizable olefinic unsaturation; and/or
    a monomer of formula (II):

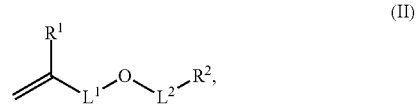

wherein:
$R^1$ and $R^2$, are independently H or $CH_3$,
$L^1$ is independently C(O), $CH_2$, $CH_2$—$CH_2$, or O—$CH_2$—$CH_2$—$CH_2$—$CH_2$,
$L^2$ is independently $(CH_2$—$CH_2O)_x$, $(CH_2CH(CH_3)O)_y$, and/or $(CH(CH_3)CH_2O)_z$, and
x, y, and z, are independently an integer or decimal in a range of from 0 to 150, with a sum of x, y, and z being in a range of from 10 to 150.

12. An aqueous mineral suspension, comprising:
an aqueous metal ore residue; and
a polymer (P) with a molecular mass Mw, measured by GPC, in a range of from 2,000 to 20,000 g/mol,
wherein the polymer (P) is prepared by a process comprising radically polymerizing, at a temperature greater than 50° C., a monomer comprising an anionic monomer (M) comprising a polymerizable olefinic unsaturation and a carboxylic acid group, optionally in salt form, in the presence of a reagent comprising hydrogen peroxide, benzoyl peroxide, acetyl peroxide, laurel peroxide, tert-butyl hydroperoxide, cumene hydroperoxide, ammonium persulphate, an alkaline metal persulphate, and/or an azo compound, optionally as combination or association comprising an $Fe^{II}$, $Fe^{III}$, $Cu^{I}$, and/or $Cu^{II}$ ion, as a radical generator,
wherein the aqueous mineral suspension has a dry solids content greater than 50 wt. %, and has
(i) a Brookfield viscosity, measured at 100 rpm and at 25° C., of less than 1,800 mPa·s,
and/or
(ii) a flow threshold measured at a temperature of 25° C. using a rheometer with imposed shearing, equipped with a bladed spindle, for a particular torsional loading, of less than 80 Pa.

13. The method of claim 1, wherein the aqueous mineral suspension has a flow threshold greater than 10 Pa and less than 80 Pa.

14. The method of claim 1, wherein the aqueous mineral suspension has a flow threshold greater than 10 Pa and less than 70 Pa.

15. The method of claim 1, wherein the polymer (P) comprises a first polymer and a second polymer, the first and second polymers being different.

16. The method of claim 1, wherein the polymer (P) comprises a first polymer, a second polymer, and a third polymer, the first, second, and third polymers being different.

17. The method of claim 1, wherein the material in the combining further comprises a lignosulfonate derivative, a silicate, an unmodified polysaccharide, and/or a modified polysaccharide, optionally combined separately from the polymer (P).

18. The method according to claim 1, wherein the aqueous metal ore residue comprises a metal oxide, a metal sulfide, or a metal carbonate.

19. The method according to claim 1, wherein the aqueous metal ore residue comprises a residual amount of a metal of less than 2,000 g dry per ton, relative to total aqueous metal ore residue dry weight.

20. The method of claim 1, wherein the polymer (P) has a molecular mass Mw, measured by GPC, in a range of from 2,200 to 10,000 g/mol, and/or
wherein the polymer (P) is at least partially neutralized.

* * * * *